March 23, 1937.　　　A. J. HIXON　　　2,074,393
CONNECTER FOR ELECTRIC CABLES AND THE LIKE
Filed March 5, 1934
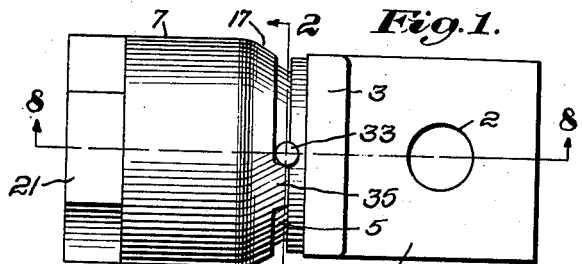
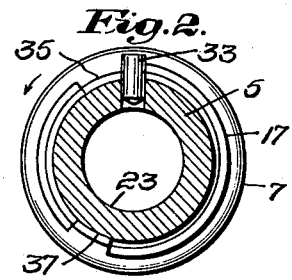
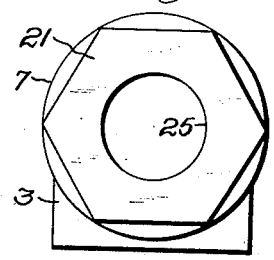
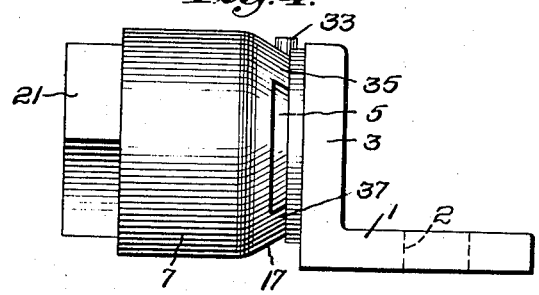
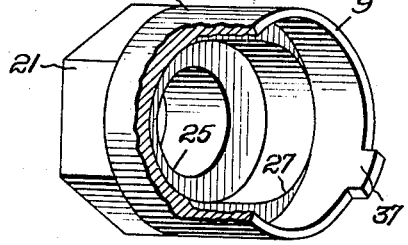
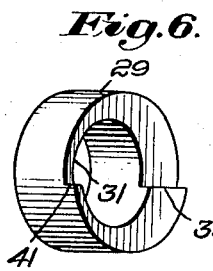
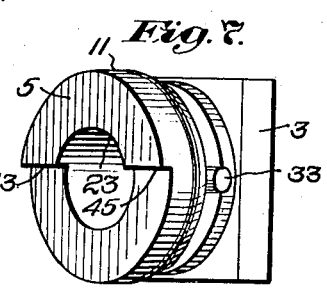
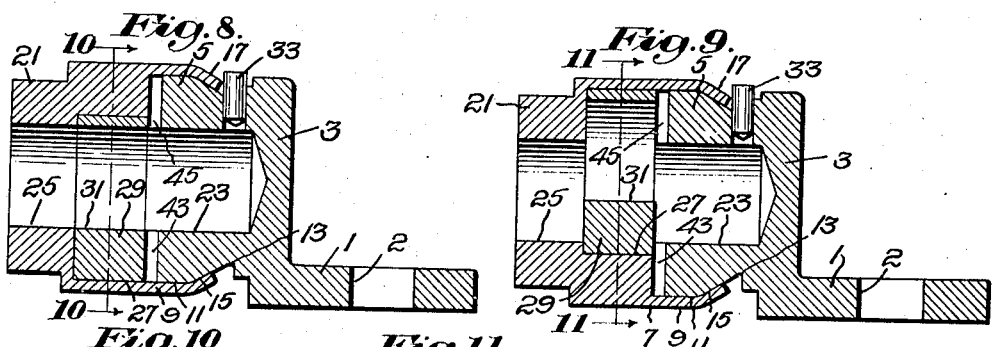
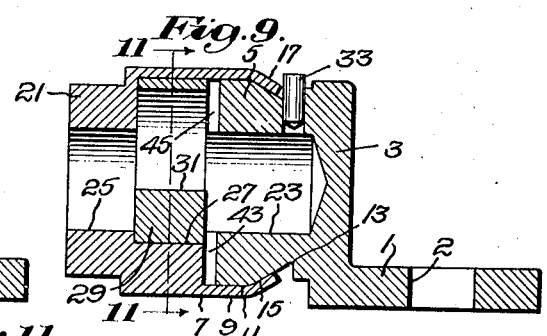
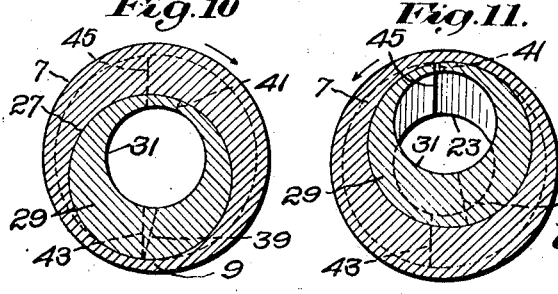
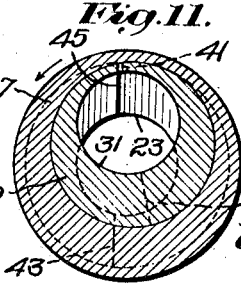
Inventor:
Alfred J. Hixon,
by Emery Booth Varney & Townsend
Attys Patented Mar. 23, 1937

2,074,393

UNITED STATES PATENT OFFICE 2,074,393

CONNECTER FOR ELECTRIC CABLES AND THE LIKE

Alfred J. Hixon, Braintree, Mass.

Application March 5, 1934, Serial No. 714,046

6 Claims. (Cl. 173—353)

My invention relates to devices for the connection of electrical conductors, such as rods, cables, and the like, and will be best understood from the following description when read in the light of the embodiment of the invention shown in the accompanying drawing. The invention constitutes an improved form of the connecter disclosed by my co-pending application Serial No. 689,729, filed September 16, 1933, issued as Patent No. 1,989,861, February 5, 1935.

In the drawing:—

Fig. 1 is a plan view of a conductor terminal constructed according to the invention;

Fig. 2 is a section on the line 2—2 of Fig. 1;

Figs. 3 and 4 are respectively an end view and side elevation of the terminal according to Fig. 1;

Figs. 5, 6 and 7 are perspective views of the elements which are assembled to form the terminal according to Fig. 1, parts being broken away in Fig. 5;

Fig. 8 is a section on the line 8—8 of Fig. 1, with the parts in position to receive the cable or other conductor;

Fig. 9 is a section corresponding to Fig. 8, but with the parts in a different operative position to cause the cable to be gripped to the terminal;

Fig. 10 is a section on the line 10—10 of Fig. 8; and

Fig. 11 is a section on the line 11—11 of Fig. 9.

Referring to the drawing, the terminal illustrated comprises a base member in the form of an angle bracket, one leg 1 of which latter is perforated at 2 for receiving a bolt or other fastening member for securing the terminal to a bus-bar or other part to be placed in electrical communication with a stranded cable or other conductor secured to the terminal. As shown, the other leg 3 of the angle bracket base is provided with a laterally projecting boss 5.

As illustrated, the terminal comprises a second member 7 which is rotatable relative to the base member. To this end, in the present embodiment of this invention, the member 7 is formed with a rearwardly extending sleeve 9 which fits over and is rotatably mounted upon the cylindrical portion 11 of the outer surface of the boss 5. As shown, this outer surface rearwardly of the cylindrical portion 11 thereof is reduced in diameter, as indicated at 13, the portions 11 and 13 being connected by a frusto-conical portion 15. As shown, the end portion 17 of the sleeve 9 is forced inwardly to cooperate with the frusto-conical surface 15 so as permanently to restrain the members 7 and 5 against substantial relative axial movement. In the present embodiment of the invention the member 7 at its outer end is faced to form a hexagonal nut 21 for enabling the member 7 to be turned relative to the member 5 by use of a wrench.

As shown, the member 5 is provided with a cylindrical recess 23, and the member 7 with a cylindrical perforation 25, each of which is coaxial with the axis of relative rotation of these members. That portion of the member 7 which is between the perforation 25 and the bottom of the recess formed by the sleeve 9 is formed with an eccentric bore 27 in which is rotatably mounted a cable gripper 29 which, as shown, is in the form of an eccentric, the latter having an opening or perforation 31 of the same diameter as the perforation 25 and recess 23.

The perforation 31 is so positioned, relative to the eccentric mounting for the eccentric, that when the eccentric is rotated about its eccentric axis, to bring it into the position shown by Figs. 8 and 10, the perforation 31 will be in registry with the perforation 25 and recess 23, in which position a stranded cable or other conductor may be inserted into the terminal through these aligned perforations and recess. By rotating the eccentric on its eccentric axis, to move it from the position shown by Figs. 8 and 10 to or toward its position shown by Figs. 9 and 11, the cable will be firmly gripped to the terminal by reason of the perforation 31 being moved out of registry with the perforation 25 and the recess 23.

Conveniently, means are provided for readily determining the position of parts illustrated by Figs. 8 and 9. To this end, in the present embodiment of the invention, the boss 5 is provided with a lug in the form of a pin 33 with which cooperate lugs 35 and 37 formed on the end of the sleeve 9. When the lug 35 is against the pin, as illustrated by Figs. 2 and 4, the parts are in the position shown by Figs. 8 and 10. By turning the member 7 from its position shown by Figs. 2 and 4 in a clockwise direction, as viewed from the left of the terminal in its position shown by Fig. 1, which is the natural direction for the operator to turn it, to bring the stop 37 against the pin 33, the parts will be moved into the position shown by Figs. 9 and 11.

Herein, for enforcing rotation of the eccentric 29 about its eccentric axis when the members 7 and 5 are rotated relative to each other, the eccentric at one of its end faces is cut away to form the shoulders 39 and 41, the shoulder 39 extending across the wider portion of the space between the perforation 31 and the peripheral edge of the eccentric, and the shoulder 41 extending across the narrower portion of said space. That end of the boss 5 which is adjacent the eccentric is cut away to form shoulders 43 and 45, the former cooperating with the shoulder 39 on the eccentric and the latter with the shoulder 41 thereon. When the member 7 is rotated from its position shown in Fig. 2 to move the stop 37 toward the pin 33, or the member 5 is rotated to move the pin toward the stop, that is to say, when they are relatively rotated in cable gripping direction, the wide shoulder 39 on the eccentric cooperates with the shoulder 43 on the boss 5 to prevent rotation of the eccentric relative to said boss and thus cause the eccentric to rotate on its eccentric axis relative to the member 7 to move the perforation 31 in the eccentric out of alignment with the per-, foration 25 and recess 23. When the member 7 is rotated in the opposite direction the shoulder 41 on the eccentric cooperates with the shoulder 45 on the boss 5 to prevent rotation of the eccentric relative to said boss and thus cause the eccentric to rotate on its eccentric axis relative to the member 7 in the opposite direction so as to move the perforation 31 back into registry with the perforation 25 and recess 23. In the embodiment of the invention illustrated, in which the shoulders 39 and 41 and the cooperating shoulders 43 and 45 are flat surfaces, a small amount of loose play, preferably slightly greater than the eccentricity of the eccentric 29, is provided between the cooperating shoulders to secure satisfactory operation of the device. By having the wide shoulder 39 in operation when the cable is being gripped, the durability of the device is enhanced because during this operation considerable force is necessary to rotate the eccentric about its eccentric axis. On the other hand, but little force is required when the eccentric is rotated on its eccentric axis to release the cable. In the construction shown therefore the shoulder 39 is positioned to secure the greatest width and strength. Further, the shoulder 39 is so positioned in the present construction with relation to the axis of rotation of the member 7 and the eccentric axis of the eccentric as to afford the greatest leverage on the eccentric, which causes less strain on the shoulder because due to the presence of the greater leverage it is necessary to apply less turning effort to the shoulder to rotate the eccentric. It will also be noted that the positions of the pin 33, and stop lugs 35 and 37 relative to the eccentric axis of the eccentric and the axis of rotation of the member 7 are such as to enforce cooperation of the shoulder 39 and shoulder 43 during the cable gripping operation.

It will be observed that in the present construction each part may be made separately, and the device assembled with absolute assurance of proper cooperation between the parts. If the sleeve 9 were, for example, screw threaded on the boss 5, as shown in my hereinbefore mentioned co-pending application, now Patent No. 1,989,861, and the eccentric were rotated by screwing the member 7 in an off or on direction relative to the boss 5, such assurance could not readily be had because of the practical difficulty in starting a screw thread at a definite angular position on the cylindrical surface of the boss or cylindrical inner surface of the sleeve 9, with the result that with such a construction it would for practical reasons be necessary to form the recess 23 and perforations 25 and 31 by a drilling operation after the parts are assembled and placed in their position shown by Fig. 8.

It will be understood that wide deviations may be made from the embodiment of the invention shown herein without departing from the spirit of the invention.

I claim:

1. A device of the character described having, in combination, a pair of relatively rotatable members one of which is mounted on a cylindrical bearing surface formed on the other so formed as to enable said members to be assembled by sliding one axially over the other without relative rotation between them, means for restraining said members against substantial movement axially of each other when relatively rotated and when at rest, at least one of said members being formed with a perforation extending in the direction of the axis of relative rotation thereof, a cable gripper formed with an opening for receiving a portion of the cable received by said perforation, said gripper being operatively mounted upon one of said members for rotation on an axis eccentric to the axis of relative rotation of said members, and means comprising interengaging abutments operatively carried by the other of said members and gripper, respectively, for enforcing operation of said gripper about its eccentric axis relative to said member upon which it is operatively mounted when said members are rotated relative to each other to move the opening of said gripper transversely relative to said perforation.

2. A device of the character described having, in combination, a pair of relatively rotatable members one of which is mounted on a cylindrical bearing surface formed on the other so formed as to enable said members to be assembled by sliding one axially over the other without relative rotation between them, means for restraining said members against substantial movement axially of each other when relatively rotated and when at rest, stop means for positively limiting the relative rotation between said members to one limit in one direction and another limit in the opposite direction, at least one of said members having a perforation extending in the direction of the axis of relative rotation thereof for receiving a cable or the like, a cable gripper formed with an opening for receiving a portion of the cable received by said perforation, said gripper being operatively mounted upon one of said members internally thereof for rotation on an axis eccentric to the axis of relative rotation of said members, and means comprising interengaging abutments operatively carried by the other of said members and said gripper for enforcing operation of said gripper about its eccentric axis relative to said member upon which it is operatively mounted when said members are rotated relative to each other, said opening of said gripper being so positioned therein as to be in substantial alignment with said perforation when said members are relatively rotated to one of said limits and materially out of alignment when relatively rotated to the other of said limits.

3. A device of the character described having, in combination, a pair of relatively rotatable members one of which is mounted on a cylindrical bearing surface formed on the other so formed as to enable said members to be assembled by sliding one axially over the other without relative rotation between them, means for restraining said members against substantial movement axially of each other when relatively rotated and when at rest, stop means for positively limiting the relative rotation between said members to one limit in one direction and another limit in the opposite direction, at least one of said members having a perforation extending in the direction of the axis of relative rotation thereof for receiving a cable or the like, a cable gripper formed with an opening for receiving a portion of the cable received by said perforation, said gripper being operatively mounted upon one of said members internally thereof for rotation on an axis eccentric to the axis of relative rotation of said members, and means comprising interengaging abutments operatively carried by the other of said members and said gripper for enforcing operation of said gripper about its eccentric axis relative to said member upon which it is operatively mounted when said members are rotated relative to each other, said perforation of said member being substantially coaxial with the axis of relative rotation of said members, and said opening of said gripper being so positioned therein as to be in substantial alignment with said perforation when said members are relatively rotated to one of said limits and materially out of alignment when relatively rotated to the other of said limits.

4. A device of the character described having, in combination, a pair of generally aligned, relatively rotatable members restrained against axial separation under axially directed forces, at least one of said members being formed with a perforation extending in the direction of the axis of relative rotation of said members for receiving a cable or the like, a cable gripper formed with an opening for receiving a portion of the cable received by said perforation, said gripper being operatively mounted upon one of said members for rotation on an axis eccentric to the axis of relative rotation of said members, means for enforcing rotation of said gripper on its eccentric axis relative to said member upon which it is operatively mounted when said members are relatively rotated for moving said opening transversely of said perforation comprising relatively wide and relatively narrow abutment means on an end face of said gripper and cooperating abutment means on the other of said members, said opening in one position of rotation of said gripper on its eccentric axis being in substantial alignment with said perforation, said wide abutment means being operative to cause rotation of said gripper from said position and said narrow abutment means being operative to cause rotation of said gripper toward said position.

5. A device of the character described having, in combination, a pair of generally aligned, relatively rotatable members restrained against axial separation under axially directed forces, at least one of said members being formed with a perforation extending in the direction of the axis of relative rotation of said members for receiving a cable or the like, a generally cylindrical cable gripper formed with an opening the axis of which is eccentric to the axis of said gripper for receiving a portion of the cable received by said perforation, said gripper being operatively mounted upon one of said members for rotation on an axis eccentric to the axis of relative rotation of said members, means for enforcing rotation of said gripper on its eccentric axis relative to the member upon which it is mounted when said members are relatively rotated for moving said opening transversely of said perforation into and out of alignment therewith, the last mentioned means including an abutment shoulder formed on an end face of said gripper and extending across the wider portion of the space between the edge of said opening and the outer edge of said gripper and abutment means on the other of said members cooperating with said shoulder for causing rotation of said gripper on its eccentric axis from the position thereof in which said opening and perforation are in alignment.

6. A device of the character described having, in combination, a pair of generally aligned, relatively rotatable members restrained against axial separation under axially directed forces, at least one of said members being formed with a perforation extending in the direction of the axis of relative rotation of said members for receiving a cable or the like, a generally cylindrical cable gripper formed with an opening the axis of which is eccentric to the axis of said gripper for receiving a portion of the cable received by said perforation, said gripper being operatively mounted upon one of said members for rotation on an axis eccentric to the axis of relative rotation of said members, means for enforcing rotation of said gripper on its eccentric axis relative to the member upon which it is mounted when said members are relatively rotated for moving said opening transversely of said perforation into and out of alignment therewith, the last mentioned means including a pair of abutment shoulders formed on an end face of said gripper, one of said shoulders extending across the wider portion of the space between the edge of said opening and the outer edge of said gripper and the other extending across the narrower portion of said space, and abutment means on the other of said members cooperating with said abutment shoulders, the shoulder on the wider portion of said space causing rotation of said gripper on its eccentric axis relative to the member upon which it is mounted from the position thereof in which said opening is in alignment with said perforation and the other abutment shoulder causing rotation of said gripper on its eccentric axis relative to the member upon which it is mounted toward said position.

ALFRED J. HIXON.